US007527064B2

(12) United States Patent
Kito et al.

(10) Patent No.: US 7,527,064 B2
(45) Date of Patent: May 5, 2009

(54) FUEL CUTOFF VALVE

(75) Inventors: Hiroaki Kito, Aichi-ken (JP); Hiroshi Nishi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 232 days.

(21) Appl. No.: 11/526,642

(22) Filed: Sep. 26, 2006

(65) Prior Publication Data

US 2007/0068574 A1 Mar. 29, 2007

(30) Foreign Application Priority Data

Sep. 28, 2005 (JP) ............................ 2005-281435
May 31, 2006 (JP) ............................ 2006-151624

(51) Int. Cl.
*F16K 17/36* (2006.01)

(52) U.S. Cl. ............................ 137/39; 137/43; 137/202

(58) Field of Classification Search .................. 137/38, 137/39, 43, 202, 587, 630.14
See application file for complete search history.

(56) References Cited

U.S. PATENT DOCUMENTS 4,982,757 A * 1/1991 Ohasi et al. ................. 137/202
5,090,459 A * 2/1992 Aoki et al. .................... 141/59
5,172,714 A * 12/1992 Kobayashi et al. ............ 137/39
5,582,198 A * 12/1996 Nagino et al. ................. 137/43
5,590,697 A * 1/1997 Benjey et al. ............... 137/202
5,632,296 A * 5/1997 Kasugai et al. ................ 137/43
5,678,590 A * 10/1997 Kasugai et al. .............. 137/202
5,755,252 A * 5/1998 Bergsma et al. ............. 137/202
5,797,434 A * 8/1998 Benjey et al. ............... 137/202
5,992,441 A * 11/1999 Enge et al. .................. 137/202
6,058,963 A * 5/2000 Enge et al. .................. 137/202
6,085,771 A * 7/2000 Benjey et al. ............... 137/202
7,152,586 B2 * 12/2006 Aoki et al. .................. 137/202

FOREIGN PATENT DOCUMENTS

JP A-07-127540 5/1995
JP A-11-190258 7/1999

* cited by examiner

*Primary Examiner*—Stephen M Hepperle
*Assistant Examiner*—Craig Price
(74) *Attorney, Agent, or Firm*—Posz Law Group, PLC

(57) ABSTRACT

The fuel cutoff valve comprises a valve support on the upper part of the float, and the seat member is mounted on the valve support. The valve support has the bending space that has an inner diameter larger than the outer diameter of the seal part. The seat member is formed from a rubber material, has a side wall formed in a cylindrical shape from the outer periphery of the seat part and a stopper on the side wall, forming the mounting space by being formed in an almost a rectangle shape cross section, and being supported on the valve support by fitting the valve support on the mounting space. The seat part is elastically deformed in the bending space direction when set on the seal part and closes the connection path.

12 Claims, 12 Drawing Sheets

10
42a
31b
FTa(FT)
31d
31c
32a
30S
32c
FL1
55
50
51
40
20
30
35
70
32b
35b
51S

FUEL CUTOFF VALVE

This application claims the benefit of and priority from Japanese Application No. 2005-281435 filed Sep. 28, 2005, and No. 2006-151624 filed May 31, 2006, the contents of which are incorporated herein by reference.

BACKGROUND OF THE INVENTION

1. Field of the Invention

The present invention relates to a fuel cutoff valve that is mounted on the upper part of a fuel tank, and that is for shutting off communication between inside of the fuel tank and outside by opening and closing the connection path that connects inside of the fuel tank and outside.

2. Description of the Related Art

On the upper part of a fuel tank, provided is a vaporized fuel processing device equipped with a full-fuel control valve and a fuel cutoff valve (roll over valve) connected to a canister, and by each valve being opened and closed at prescribed fuel fluid levels, air flow to outside the fuel tank is secured, and outflow of the liquid fuel to outside is prevented. The roll over valve cuts off fuel to outside at the fuel fluid level above the full tank fluid level to prevent fuel leakage such as when the vehicle is on a slope, when the vehicle is driving in slalom form, and the like.

However, in recent years, to deal with the varied and large space occupied in vehicles, flattening of fuel tanks has been studied, but with the kind of flattened fuel tank, to make the ratio of the dead space at the upper part of the fuel tank smaller, it is preferable to set the fuel fluid level at which the valve closes as high as possible. However, when the fuel fluid level during closing of the valve is set high, it is easy for the roll over valve to be immersed in fluid. Even in the case of the kind of fluid immersion, as shown in JP-A-7-127540 and JP-A-11-190258, known are means whereby to obtain high sealing properties, a rubber valve plug is mounted on the center upper part of a float, and when the rubber valve plug is closing the connection path, the outer periphery of the rubber valve plug is flexibly deformed.

However, when cutting off the connection path with a small path area like with a roll over valve, it is difficult to sufficiently bend the outer periphery of the rubber valve plug, and there was the problem that it was not possible to obtain high sealing properties.

SUMMARY

An advantage of some aspects of the invention is provided with a fuel cutoff valve that can close with good sealing properties even in the case of a connection path with a small path area.

According to an aspect of the invention, the present invention is provided with a fuel cutoff valve that is mounted on an upper part of a fuel tank to open and close a connection path that connects an inside of the fuel tank and with outside. The fuel cutoff valve comprises a casing having a valve chamber that communicates inside of the fuel tank and the connection path and a seal part that projects in a circular shape toward the valve chamber provided facing the connection path, and a float mechanism having a float that is stored within the valve chamber and that rises according to a fuel fluid level within the fuel tank, a valve support that is formed on an upper part of the float, and a seat member mounted on the valve support that opens and closes the connection path by seating on and separating from the seal part. The seat member has a seat part formed from a flexible material and includes a seat surface that seats on and separates from with the seal part and an elastic deforming part formed along an outer periphery of the seat surface, and a supported part that is placed projecting from an outer periphery of the seat part with thicker walls than the elastic deforming part and that is mounted for the valve support. The valve support has a bending space having an inner diameter larger than the outer diameter of the seal part, and the bending space being configured to be formed to allow elastic deformation of the elastic deforming part when the seat surface seats on the seal part.

When fuel is supplied to a fuel tank using the fuel cutoff valve of the present invention and the fuel tank reaches a specified fluid level, a float floats upward by buoyancy with the fuel that flows into the valve chamber. By the rising of the float, the seat member closes the connection path, which cuts off the fuel tank to outside, and this prevents the outflow of fuel from the fuel tank to outside.

The seat member is formed from a flexible material, is supported on the valve support, is elastically deformed by the elastic deforming part when the seat part is set on the seal part, and bends toward the inside of the bending space of the valve support. The bending space is formed to an inner diameter larger than the outer diameter of the seal part, and operates as the space the seal part enters into for sure elastic deformation of the seat part. Thus, the seat part, even if it has a small diameter seal part, is easily elastically deformed with a low load using the elastic deforming part so that there is a tight seal, so it is possible to obtain high sealing properties. In fact, it is also possible to independently set the size of the seat part in relation to the size of the seal part, so there is a high degree of freedom of design. Also, even if the float is set on the seal part at a slant, the seat part is elastically deformed following the seal part, so high sealing properties are obtained.

Also, the thickness of the elastic deforming part is formed to be thinner than the thickness of the supported part, so elastic deformation with the elastic deforming part is performed easily when the seat surface is set on the seal part, and it is possible to increase the sealing properties one level higher, and the thickness of the supported part is thicker relative to the elastic deforming part, and the elastic deformation of the supported part becomes smaller, and thus it is possible to prevent opening of the seal member in the outward radial direction.

Also, as an optimal aspect of the present invention, it is possible to use a constitution for which the valve support has a support projecting part that is placed projecting from the center upper part of the float, and the bending space is formed at the axial center of the support projecting part. Here, it is possible to use a constitution for which the support projecting part includes a support base placed projecting from the center upper part of the float, a circular disk part extended in the radial direction from the upper part of the support base, and a cylinder part formed facing upward from the outer periphery of the circular disk part, and the bending space is formed by the upper surface of the circular disk part and the inner wall of the cylinder part.

As an optimal aspect of the supported part, it is possible to use a constitution having a cylindrical shaped side wall that covers the outer periphery wall of the valve support formed in a cylindrical shape from the outer periphery of the seat part, and it is possible use a constitution having a stopper that stops pulling out from the valve support formed on the lower part of the side wall.

The float can use a constitution having a buoyancy chamber which is opened downward and a through hole which pierces the support projection part and connects the buoyancy chamber, and for which the space of the upper part of the through hole is formed so as to be the bending part.

Also, as another optimal aspect of the present invention, it is possible to use a constitution for which the float has a buoyancy chamber opened downward and a through hole that pierces the float and connects with the buoyancy chamber, the valve support is formed on the opening edge part of the through hole, and the supported part has a side wall fitted to the through hole and a stopper engaged to the lower part of the opening edge part formed on the lower part of the side wall. The valve support of the mechanism can be made compact in the float height direction if it is not projected from the upper part of the float.

Also, as an optimal aspect of the elastic deforming part, it is possible to use a constitution for which this is formed at a different thickness than that of the seat surface, or a constitution for which this is formed in accordion form with the seat surface and the supported part connected so as to be elastically deformable.

Furthermore, as an optimal aspect of the supported part, by using a constitution for which part of the side wall of the supported part is formed at a thin thickness in the axial direction, or a constitution for which the side wall of the supported part has a slit formed in the axial direction, it is possible to easily do the work of mounting onto the valve support.

Also, as another aspect, for a fuel cutoff valve which is mounted on the upper part of a fuel tank and which cuts off communication between the fuel tank and outside by opening and closing the connection path that connects inside of the fuel tank and outside. The fuel cutoff valve comprises a casing that has a valve chamber that communicates between inside of the fuel tank and the connection path and a seal part provided facing the connection path, a float mechanism having a float that is stored inside the valve chamber and that rises according to the fuel fluid level inside the fuel tank, and a flexible seat member that is mounted on the upper part of the float and that opens and closes the connection path by seating on and separating from the seal part, and a restriction element that restricts the elastic deformation volume of the seat member with the seat member in a state set on the seal part.

When fuel is supplied to a fuel tank using the fuel cutoff valve of the other aspect and a specified fuel level of the fuel tank is reached, the float is raised by buoyancy with the fuel that has flowed inside the valve chamber. By the rising of the float, the seat member closes the connection path, the fuel tank is cut off in relation to outside, and the outflow of fuel from the fuel tank to outside is prevented. In a state with the seat member elastically deformed and set on the seal part, the restriction element is able to increase the durability without repeated elastic deformation occurring for which the elastic deformation volume of the seat member will become a specified volume or greater.

As the optimal constitution of another aspect, the restriction element can be constituted set projecting from the inner wall of the casing and on the projecting part formed so as to surround the outer periphery of the seal part. With the constitution, the restriction element can use a constitution for which a plurality are arranged in the circumferential direction so as to surround the center of the seal part, or a constitution arranged in a radial pattern. By doing this, the contact surface of the rubber seal member and the restriction element is small, and it is possible to prevent fixing, adhesion, or the like.

As yet another optimal constitution of the aspect, it is possible to use a constitution for which the seat member has a seat part that is set on the seal part, and an elastic deforming part formed at the outer periphery of the seat member. Also, as a constitution for mounting the seat member on the float, it is possible to use a constitution for which the valve support is equipped on the upper part of the float, the valve support has a bending space having an inner diameter larger than the outer diameter of the seal part, and the bending space is formed so as to allow elastic deformation of the elastic deforming part when the seat surface is set on the seal part. With the constitution, it is possible for the restriction element to prevent the seat part from being sandwiched between the bottom surface of the bending space and the seal part and being damaged, and to prevent the seat part from entering inside the bending space too far and contacting the bottom surface of the bending space or the like and being damaged.

Here, as an optimal aspect of the restriction element, it is possible to use a constitution which is the projecting part formed on the outer periphery of the elastic deforming part and the elastic deformation volume of the elastic deforming part is restricted by being in contact with the inner wall of the casing, and it is possible to use a constitution which is the upper part of the float equipped with a restriction element placed projecting so as to surround the seat member.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment

(1) Summary Structure of the Fuel Cut Off Valve 10

Figure 1:
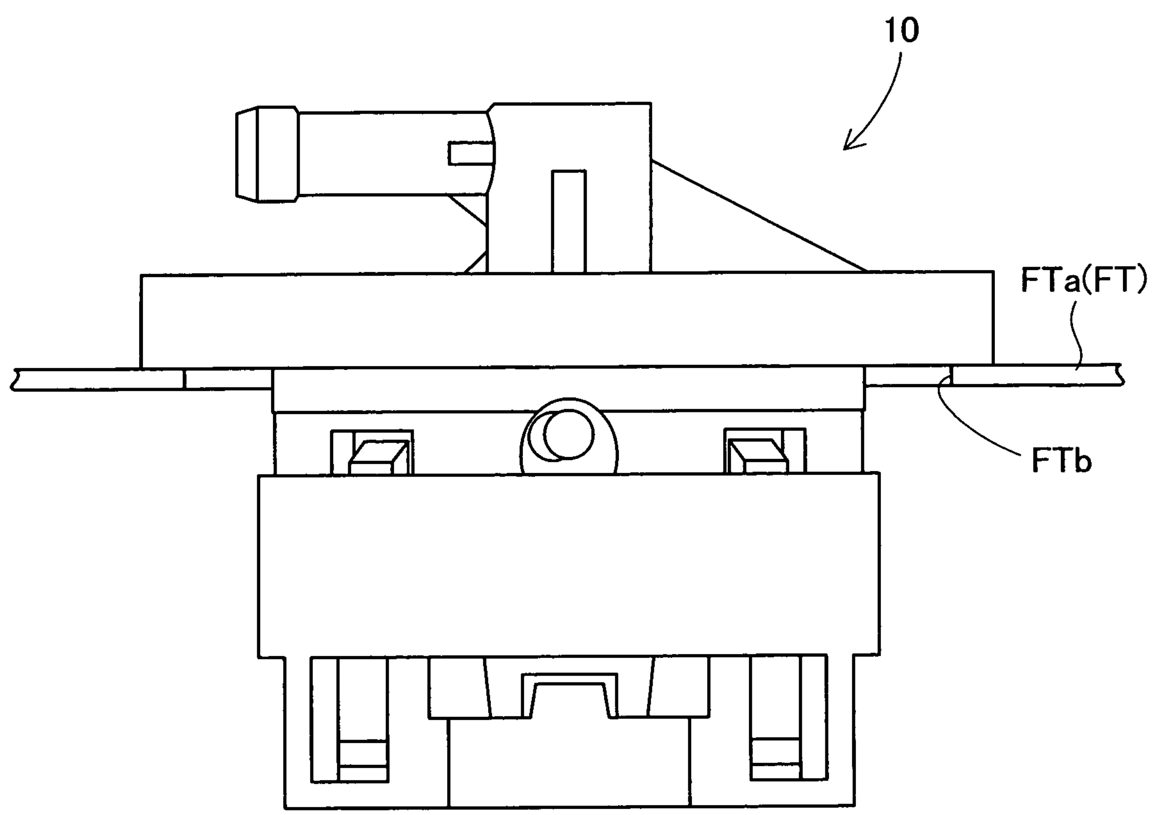
FIG. 1 is a side surface view showing a fuel cutoff valve attached to the upper part of the fuel tank of a vehicle of a first embodiment of the present invention.
Figure 2:
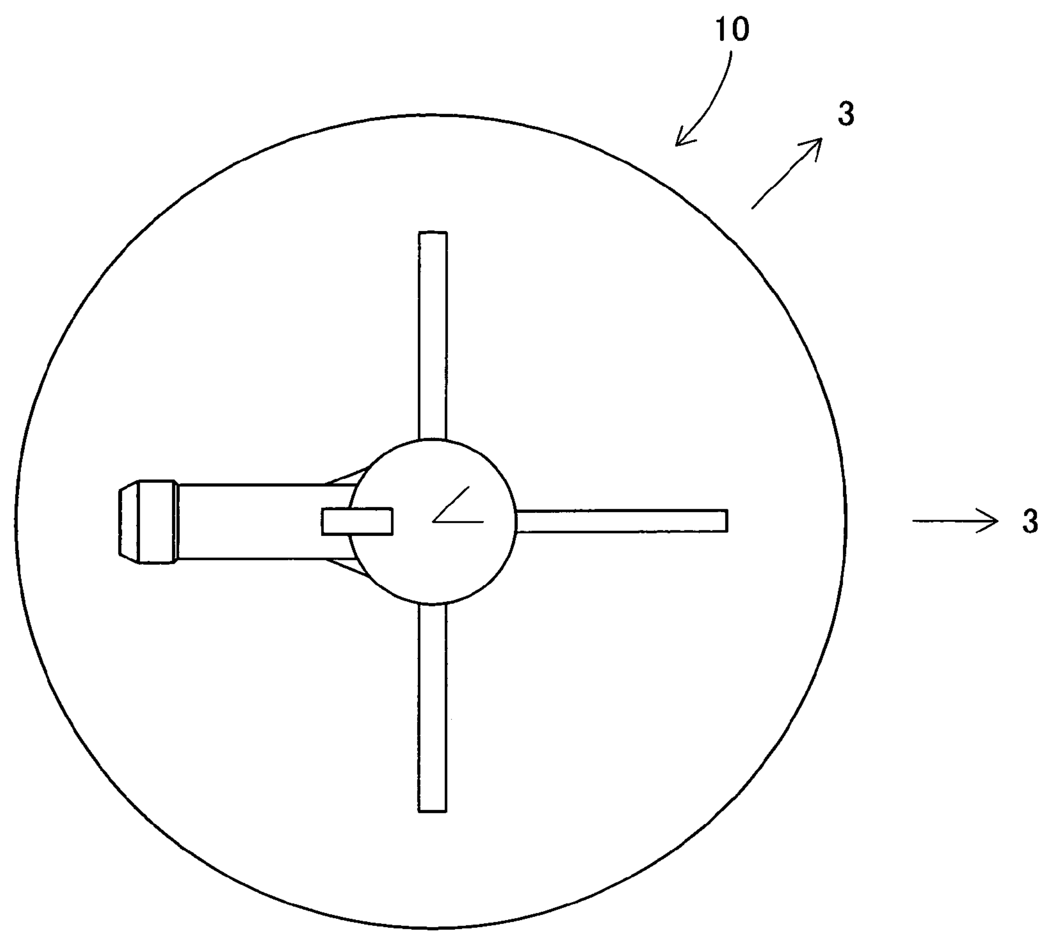
FIG. 2 is a plan view of the fuel cutoff valve.
Figure 3:
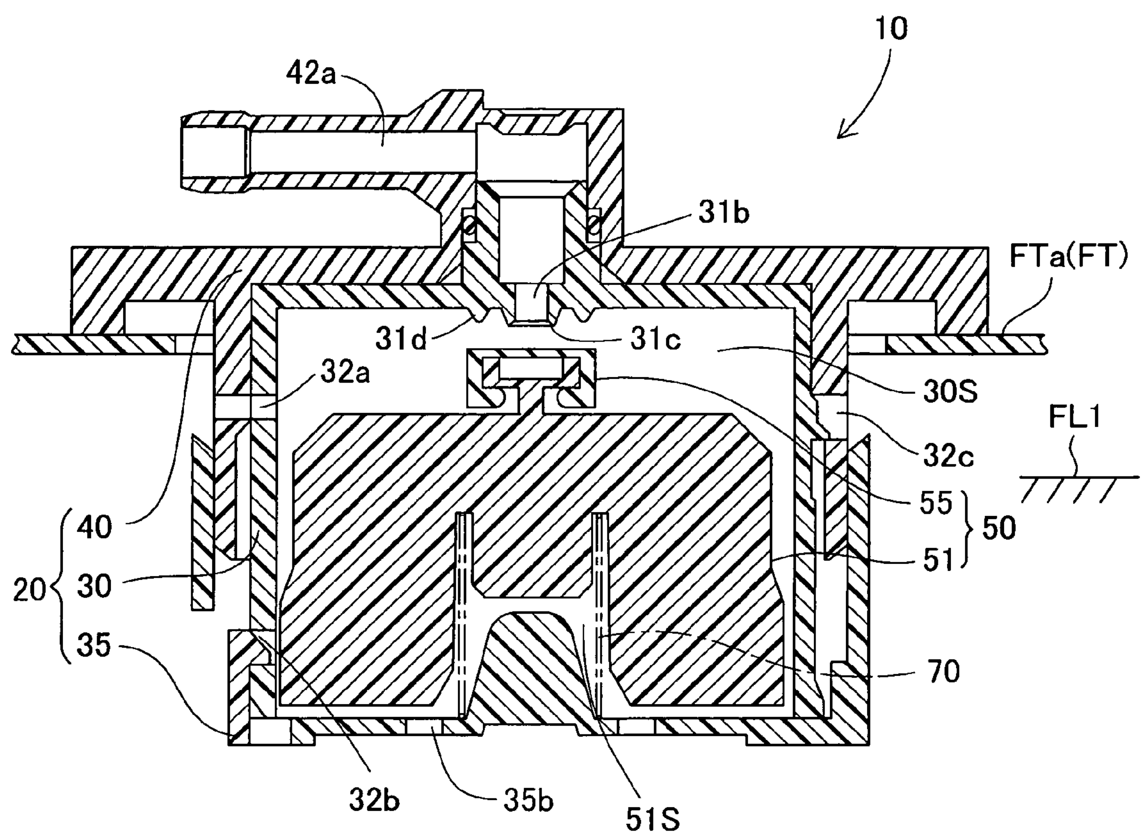
FIG. 3 is a cross sectional view along the line 3-3 of FIG. 2.

FIG. 1 is a side surface view showing the fuel cutoff valve 10 attached to the upper part of the fuel tank FT of a vehicle of a first embodiment of the present invention, FIG. 2 is a plan view of the fuel cutoff valve 10, and FIG. 3 is a cross sectional view along the line 3-3 of FIG. 2. In FIG. 1, the fuel tank FT has its surface formed from a composite resin that contains polyethylene, and on that tank upper wall FTa is formed an attachment hole FTb. Attached to the tank upper wall FTa is the fuel cutoff valve 10 with its lower part in a state entering the attachment hole FTb. The fuel cutoff valve 10 controls the outflow of the fuel within the fuel tank FT to the canister when the vehicle is slanted or when it is oscillating.

(2) Structure of Each Part of the Fuel Cut Off Valve 10

In FIG. 3, the fuel cutoff valve 10 is equipped with a casing 20, a float mechanism 50, and a spring 70 as the main constitution. The casing 20 is equipped with a casing main body 30, a bottom plate 35, and a cover 40, the space enclosed by the casing main body 30 and the bottom plate 35 becomes a valve chamber 30S, and stored in the valve chamber 30S is the float mechanism 50 supported on the spring 70.

Figure 4:
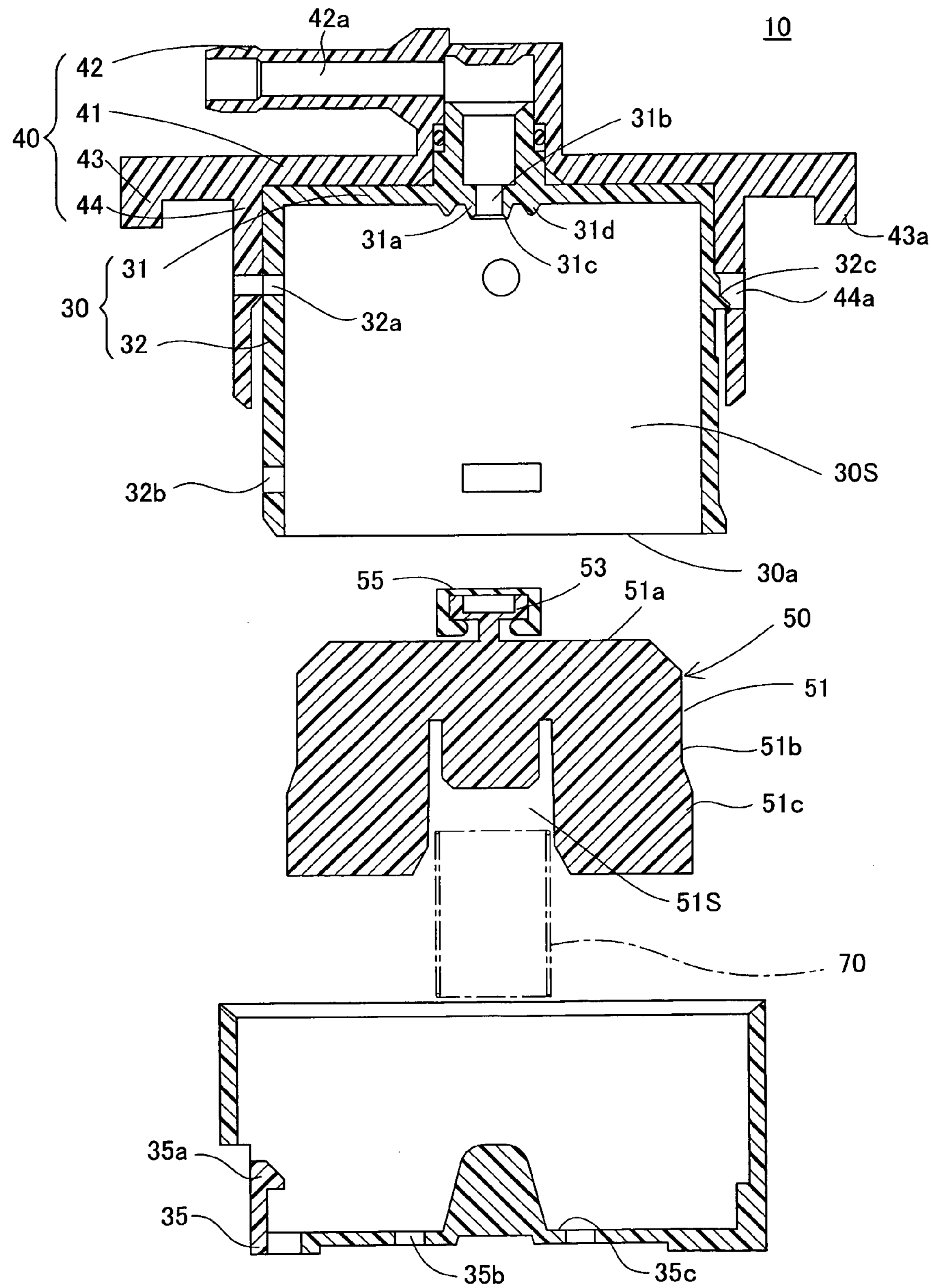
FIG. 4 is a cross sectional view of the assembly of the fuel cutoff valve.

FIG. 4 is a cross sectional view of an assembly of the fuel cutoff valve 10. The casing main body 30 has a cup shape enclosed by a top wall part 31 and a side wall 32, and its lower part is used as an opening 30*a*. At the center part of the top wall part 31 is formed a path forming projecting part 31*a* that is placed projecting facing downward, and formed piercing a path forming projecting part 31*a* is a connecting path 31*b* connected to the valve chamber 30S. The valve chamber 30S side of the connection path 31*b* is a circular seal part 31*c*. Formed on the side wall 32 is an air passage hole 32*a* that connects inside of the fuel tank and the valve chamber 30S, and there is also formed an engagement hole 32*b* for attaching the bottom plate 35. The bottom plate 35 is the member that closes the opening 30*a* of the casing main body 30, and by an engagement claw 35*a* formed at its outer periphery being engaged with the engagement hole 32*b* of the casing main body 30, mounting is done so as to close the opening 30*a* of the casing main body 30. On the upper surface of the bottom plate 35 are formed a communication hole 35*b* and a spring support part 35*c* to support the bottom edge of the spring 70.

The cover 40 is equipped with a cover main body 41, a tube part 42 projecting to the side from the center of the cover main body 41, a flange 43 formed at the outer periphery of the cover main body 41, and a support part 44, and these are formed as a single unit. A cover path 42*a* is formed on the tube part 42, and one end of the cover path 42*a* is connected to the valve chamber 30S of the casing main body 30 through the connection path 31*b*, and the other end is connected to the canister (not illustrated) side. The support part 44 is formed on the lower part of the cover main body 41, and is the cylinder body that is fitted to and supports the upper part of the casing main body 30. Engagement holes 44*a* are formed on the support part 44. By the engagement holes 44*a* being engaged with engagement claws 32*c* formed on the side wall 32 of the casing main body 30, the cover 40 holds the casing main body 30. Also, formed on the bottom end part of the flange 43 is an outside welding part 43*a* welded to the tank upper wall FTa (see FIG. 3) of the fuel tank FT.

The float mechanism 50 is equipped with a float 51 and a seat member 55 mounted on the upper part of the float 51. The float 51 is constituted in a container shape equipped with an upper wall part 51*a* and a cylindrical shaped side wall 51*b* formed downward from the outer periphery of that upper wall part 51*a*, and its inside space becomes a buoyancy chamber 51S for buoyancy to occur. Also, Guide protrusions 51*c* are formed on the outer periphery of the float 51. The guide protrusions 51*c* are set projecting in a rib shape in the up and down direction at eight locations at an interval in the circumference direction on the side wall 51*b* of the float 51. The spring 70 is placed within the buoyancy chamber 51S of the float 51. The spring 70 energizes the float 51 in upward direction by being interposed between one end of the float 51 and the upper surface of the bottom plate 35.

Figure 5:
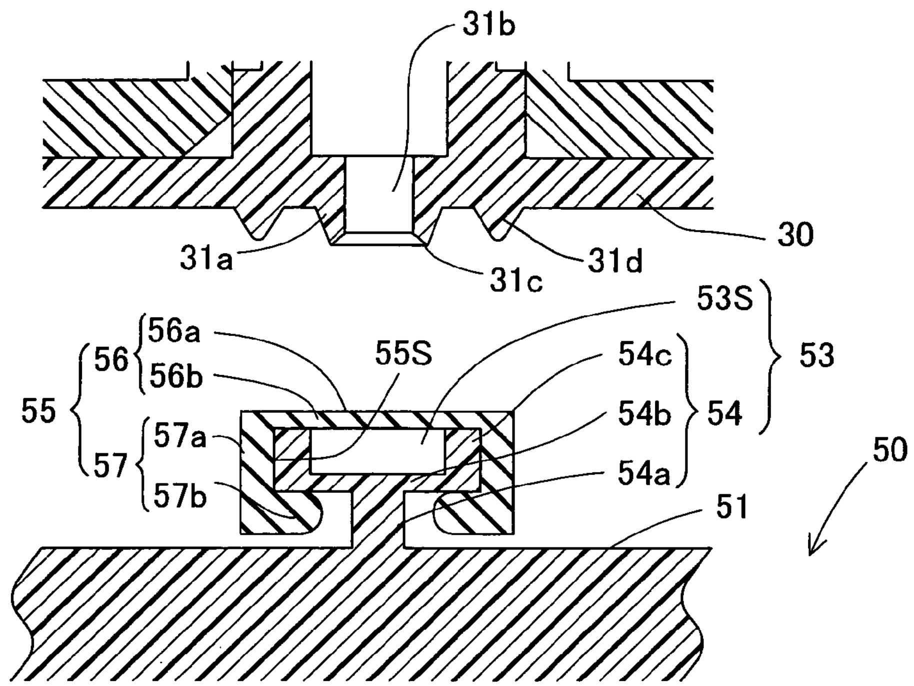
FIG. 5 is a cross sectional view showing the upper part of the float mechanism and the casing main body.
Figure 6:
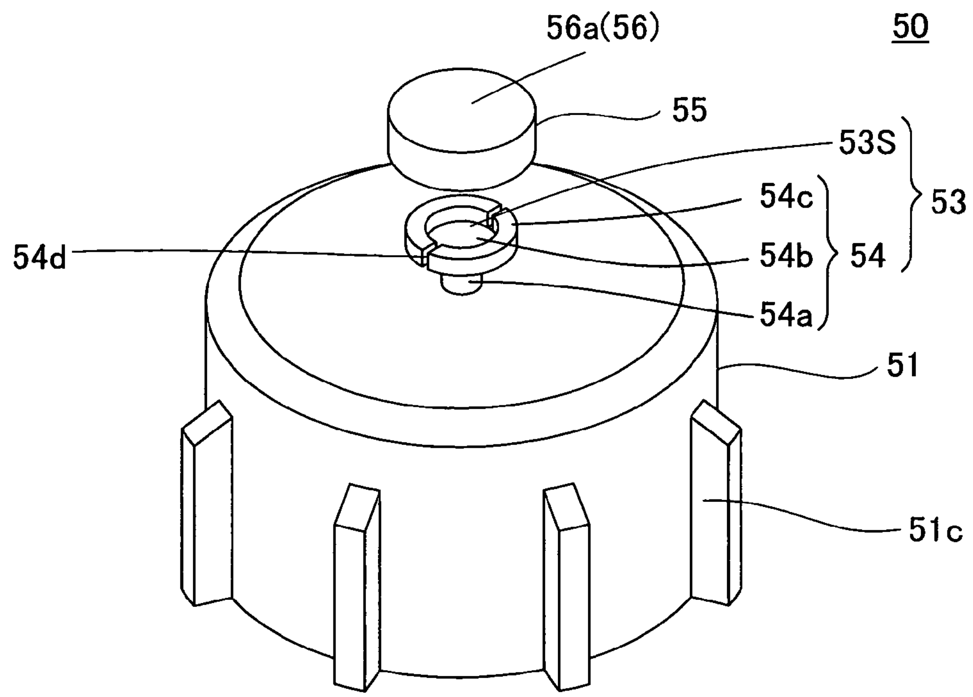
FIG. 6 is a perspective view showing the assembly of the float mechanism.

The float 51 is equipped on the center of its upper part with a valve support 53 that supports the seat member 55. FIG. 5 is a cross sectional view that shows the upper part of the float mechanism 50 and the casing main body 30, and FIG. 6 is a perspective view that shows an assembly of the float mechanism 50. The valve support 53 is equipped with a support projection part 54 that is placed projecting from the upper part of the float 51. The support projection part 54 is equipped with a round pillar shaped support base 54*a*, a disk 54*b* formed on the upper part of the support base 54*a*, and a cylinder 54*c* placed projecting upward from the outer periphery of the disk 54*b*, and the space defined by the support base 54*a* and the cylinder 54*c* becomes the bending space 53S. Two liquid outlet grooves 54*d* (FIG. 6) are formed on the round disk 54*b* of the valve support 53. The liquid outlet grooves 54*d* discharge the fuel that pooled in the bending space 53S, and by letting out air within the bending space 53S, makes it easier for the seat member 55 to bend.

Figure 7:
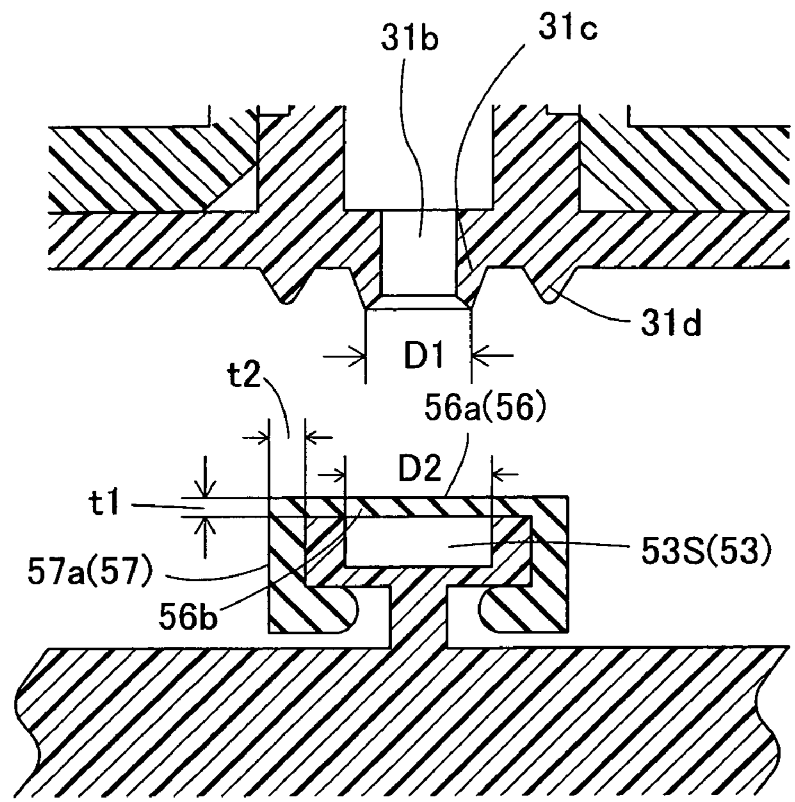
FIG. 7 describes the operation of the fuel cutoff valve.

The seat member 55 is formed from a seat part 56 formed from a flexible material (rubber material, thermoplastic elastomer, or the like) in a cup shape opened facing downward and a supported part 57 placed projecting downward from the outer periphery of the seat part 56, and the inside of this forms the mounting space 55S. The seat part 56 is equipped with a seat surface 56*a* that seat on and separates from with the seal part 31*c*, and an elastic deforming part 56*b* that is formed along the outer periphery of the seat surface 56*a*. When the seat surface 56*a* is pressed against the seal part 31*c*, the elastic deforming part 56*b* is elastically deformed so as to be concave within the bending space 53S and is set on the seal part 31*c* (see FIG. 9 and FIG. 10). The supported part 57 is formed by a side wall 57*a* and a stopper 57*b*. The seat member 55 is attached to the valve support 53 by pressing the valve support 53 into the mounting space 55S. Here, as shown in FIG. 7, by forming the seat part 56 to be thinner than the side wall 57*a* of the supported part 57, in other words, by having the thickness of the seat part 56 t1 be 0.3 to 1.5 mm, and having the thickness of the side wall 57*a* t2 be 2 mm or greater, in other words, t1<t2, elastic deformation of the elastic deforming part 56*b* is easy. Also, when the outer diameter of the seal part 31*c* is D1 and the inner diameter of the bending space 53S is D2, this is formed with D1<D2, and as is described later, elastic deformation of the elastic deforming part 56*b* by the pressing force of the seal part 31*c* is easy.

Figure 8:
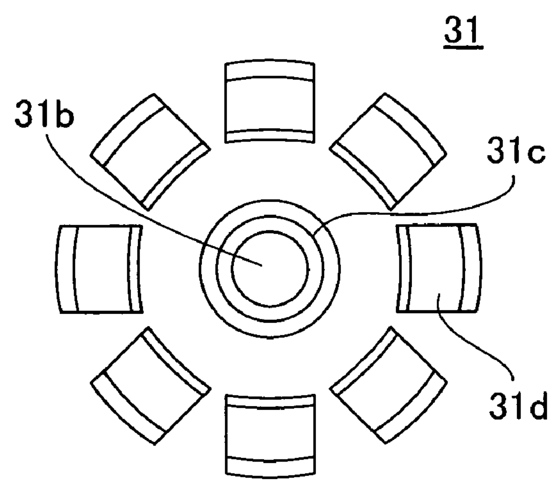
FIG. 8 is a view seen from under the seal part formed on the top wall part.

FIG. 8 shows the seal part 31*c* formed on the top wall part 31 seen from below. In FIG. 8, at the bottom surface of the top wall part 31, on the outer periphery of the seal part 31*c* are placed projecting the restriction element 31*d* divided into a plurality (eight locations in FIG. 8) and arranged in a circle. The restriction element 31*d* restricts the elastic deformation volume of the seat part 56 by being in contact with the outer periphery of the seat part 56 of the seat member 55 shown in FIG. 5.

(3) Movement of the Fuel Cut Off Valve 10

Figure 9:
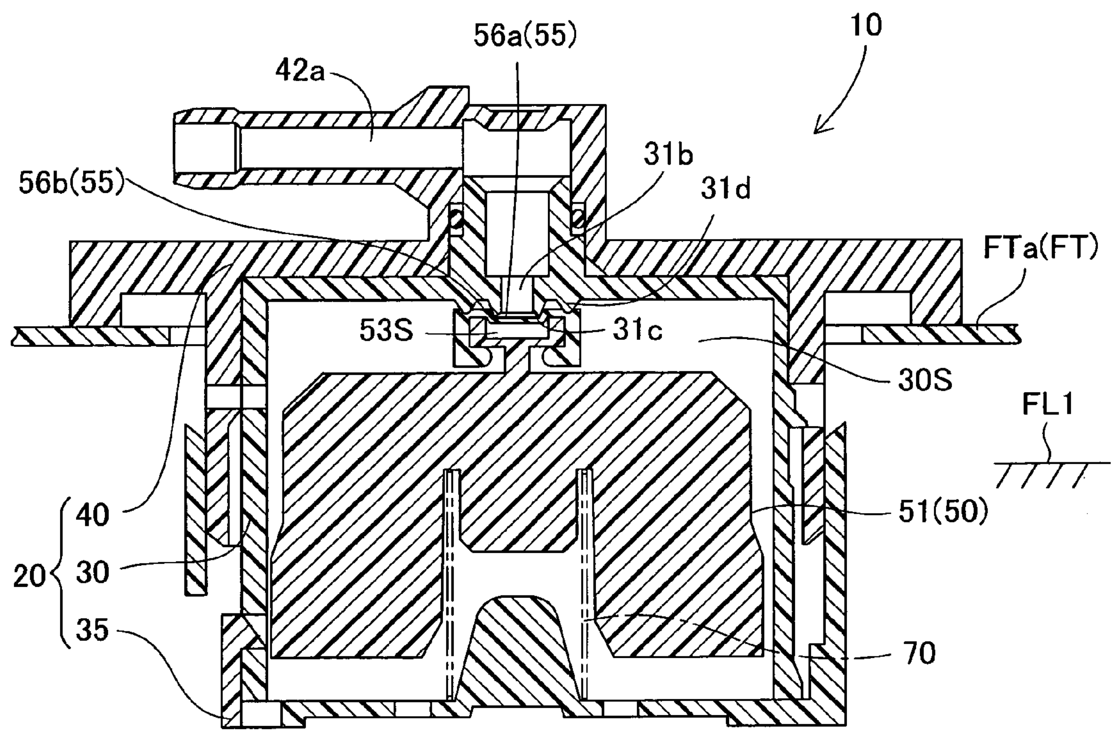
FIG. 9 describes the movement of the fuel cutoff valve.
Figure 10:
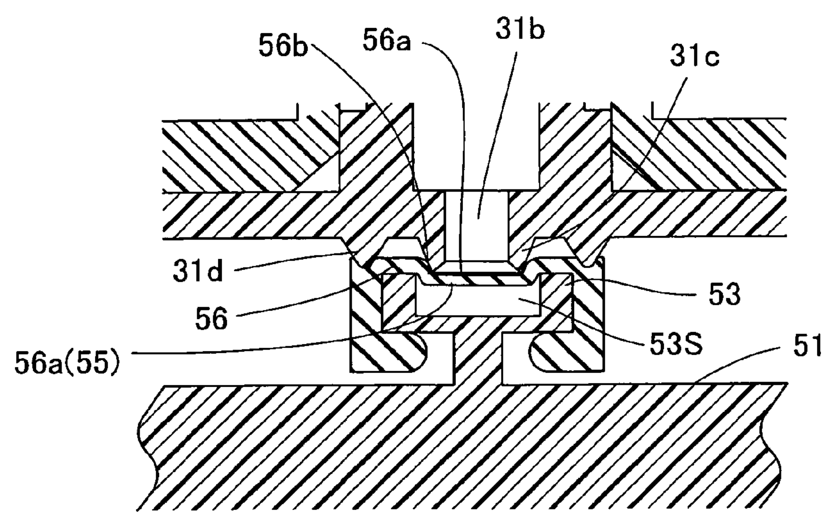
FIG. 10 describes the operation of the fuel cutoff valve.

Next, the movement of the fuel cutoff valve 10 is described. In FIG. 3, the fuel vapor that was generated by vaporization of the fuel inside the fuel tank FT enters the valve chamber 30S through the air passage hole 32*a*, and from the valve chamber 30S, is allowed to escape to the canister side through the connection path 31*b* and the cover path 42*a*. Then, when the fuel fluid level inside the fuel tank FT rises due to the vehicle slanting or the like, the fuel flows into the valve chamber 30S through the communication hole 35*b*. Then, as shown in FIG. 9, when the fuel fluid level reaches the specified fluid level FL1, through the balance of the force upward due to the buoyancy of the float 51 and the load of the spring 70 and the force downward due to the empty weight of the float 51 and the seat member 55, when the former goes above the latter, the float 51 rises. At this time, as shown in FIG. 10, the seat member 55 elastically deforms so as to curve toward the bending space 53S by being pressed by the seal part 31*c*, and the seat surface 56*a* of the seat member 55 closes the connection path 31*b*. At this time, the upper surface of the seat member 55 is in contact with the restriction element 31*d* and the rise of the float 51 is controlled, so the seat member 55 does not extend more than that due to the seal part 31*c*.

In this way, when the vehicle is slanted or the like, the fuel vapor is allowed to escape from the fuel tank FT, and it is possible to prevent the outflow of fuel to outside the fuel tank FT. On the other hand, when the fuel fluid level of the fuel tank FT drops, and the fuel inside the valve chamber 30S is discharged from the communication hole 35*b* or the like, the float 51 buoyancy decreases and it receives downward force, so the seat member 55 separates from the seal part 31*c*, and the connection path 31*b* opens.

(4) Operation and Effect of the Embodiment

With the constitution of the fuel cutoff valve 10 of the embodiments noted above, the following effects are exhibited.

(4)-1 As shown in FIG. 9, when it is set on the seal part 31*c*, the seat member 55 made of rubber is elastically deformed by the elastic deforming part 56*b* toward the inside of the bending space 53S of the valve support 53. At this time, the bending space 53S is formed with an inner diameter larger than the outer diameter of the seal part 31*c*, and operates as the space into which the seal part 31*c* enters and securely elastically deforms the elastic deforming part 56*b*. Thus, the seat part 56 is able to obtain high sealing properties because it is pressed by the small diameter seal part 31*c* and is elastically deformed so as to be sealed tightly.

(4)-2 Even when the float 51 is set on the seat part 31*c* at a diagonal, the elastic deforming part 56*b* is elastically deformed following the seal part 31*c*, so high sealing properties are obtained.

Figure 11:
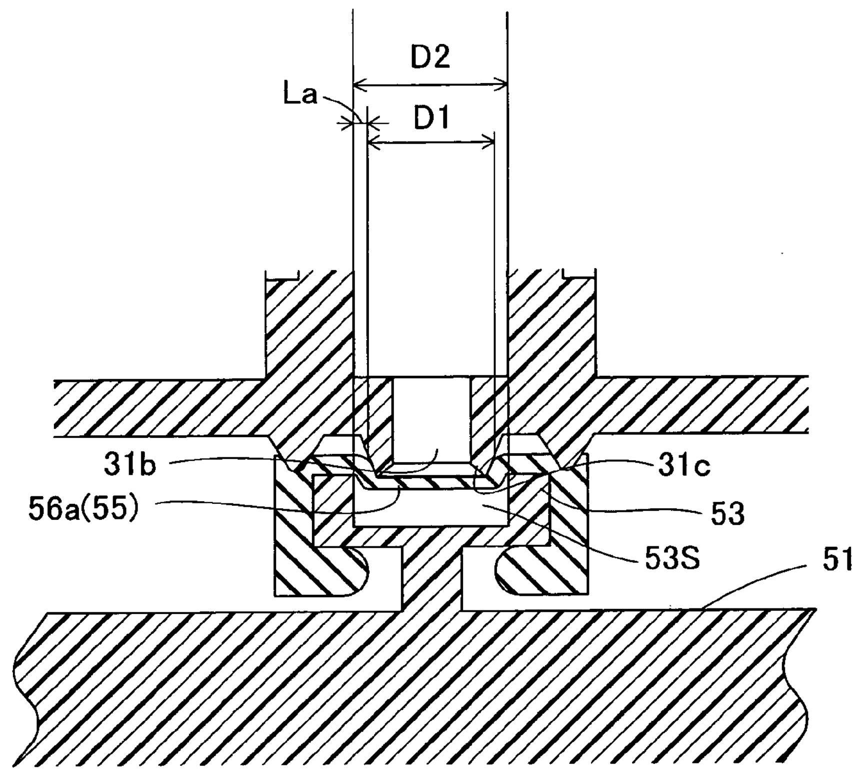
FIG. 11 describes the operation of the fuel cutoff valve.

(4)-3 Using FIG. 11, the following description is why it is possible to sufficiently bend the seat member 55 and why it is possible to have a high degree of freedom of design. The parameter that indicates the ease of bending the seat member 55 is represented by the distance La that is the difference between the inner diameter D2 of the bending space 53S and the outer diameter D1 of the seal part 31*c*. The distance La can easily be handled as an independent parameter from the diameter D1 by making the outer diameter of the seat member 55 and the bending space 53S bigger. Therefore, with the embodiment, even when the outer diameter D1 of the seal part 31*c* is small, it is possible to easily handle this by making the seat member 55 or the like bigger without considering other elements such as rubber material elasticity or the like, making the degree of freedom of design high.

(4)-4 In a state when the float 51 rises, the seat part 56 of the seat member 55 elastically deforms, and is set on the seal part 31*c*, the top surface of the seat part 56 is in contact with the restriction element 31*d*, and the rise of the float 51 is controlled, so the seat part 56 does not extend more than that with the seal part 31*c*. Specifically, the restriction element 31*d* restricts the elastic deformation volume of the seat member 55, and thus it is possible to prevent the seat member 56 from becoming sandwiched between the bottom surface of the bending space 53S and the seal part 31*c* and becoming damaged.

(4)-5 The restriction elements 31*d* are arranged at equal intervals in the circumference direction with the seal part 31*c* in the center, and the contact area with the seat member 55 is reduced, so adhesion of the seat surface 56*a* to the seal part 31*c* is prevented.

B. Second Embodiment

Figure 12:
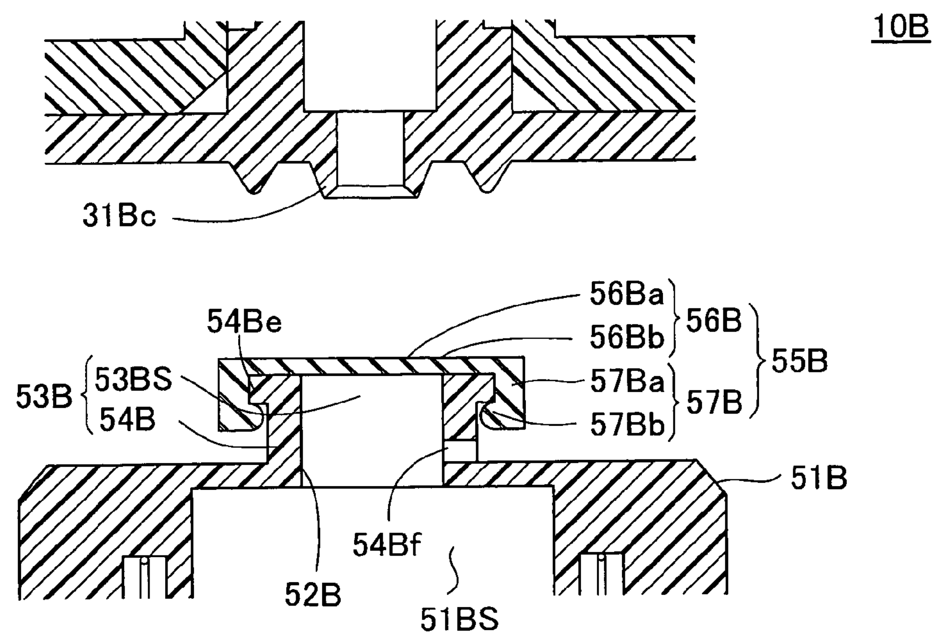
FIG. 12 is a cross sectional view showing the fuel cutoff valve of a second embodiment.
Figure 13:
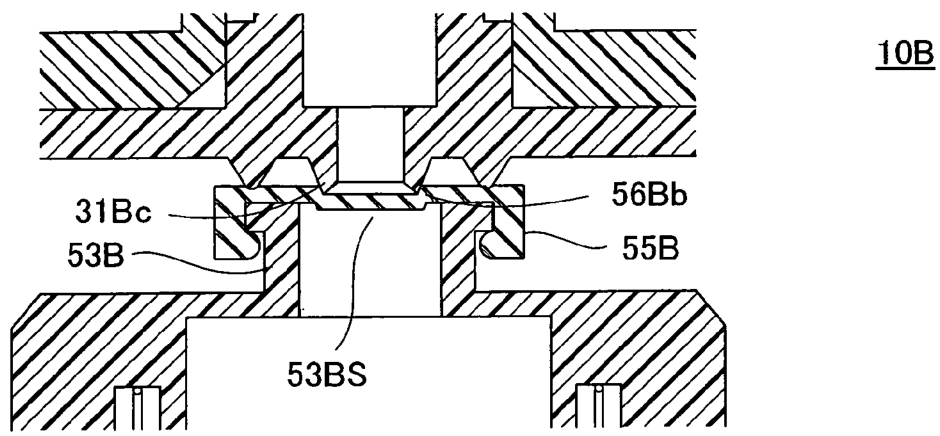
FIG. 13 describes the movement of the fuel cutoff valve of the second embodiment.

FIG. 12 and FIG. 13 are cross sectional views showing a fuel cutoff valve 10B of a second embodiment. The embodiment is characterized by the constitution of a valve support 53B. Specifically, a buoyancy chamber 51BS that opens downward is formed on a float 51B. Also, at the upper part of the float 51B is placed projecting in a cylinder from a support projection part 54B that constitutes the valve support 53B. The top end of the support projection part 54B becomes a stopper expansion part 54Be. At the axis center of the support projection part 54B is formed a through hole 52B connected with the buoyancy chamber 51BS. The space of the upper part of the through hole 52B becomes a bending space 53BS. Also, at the side part of the support projection part 54B is formed an open hole 54Bf for air release connected to the through hole 52B. The seat member 55B is equipped with a seat part 56B formed from a seat surface 56Ba and an elastic deforming part 56Bb, and a supported part 57B set projecting from the outer periphery of the seat part 56B. The supported part 57B is equipped with a side wall 57Ba set projecting with a thicker wall than the elastic deforming part 56Bb, and a stopper 57Bb set projecting at the bottom end of the side wall 57Ba and engaged with a stopper expansion part 54Be of the valve support 53B. With the constitution, as shown in FIG. 13, when closing the fuel cutoff valve 10B, when the seat member 55B is set on the seal part 31Bc, elastic deforming is done with a low load by the elastic deforming part 56Bb, this bends toward the inside of the bending space 53BS of the valve support 53B, and it is possible to obtain high sealing properties.

C. Third Embodiment

Figure 14:
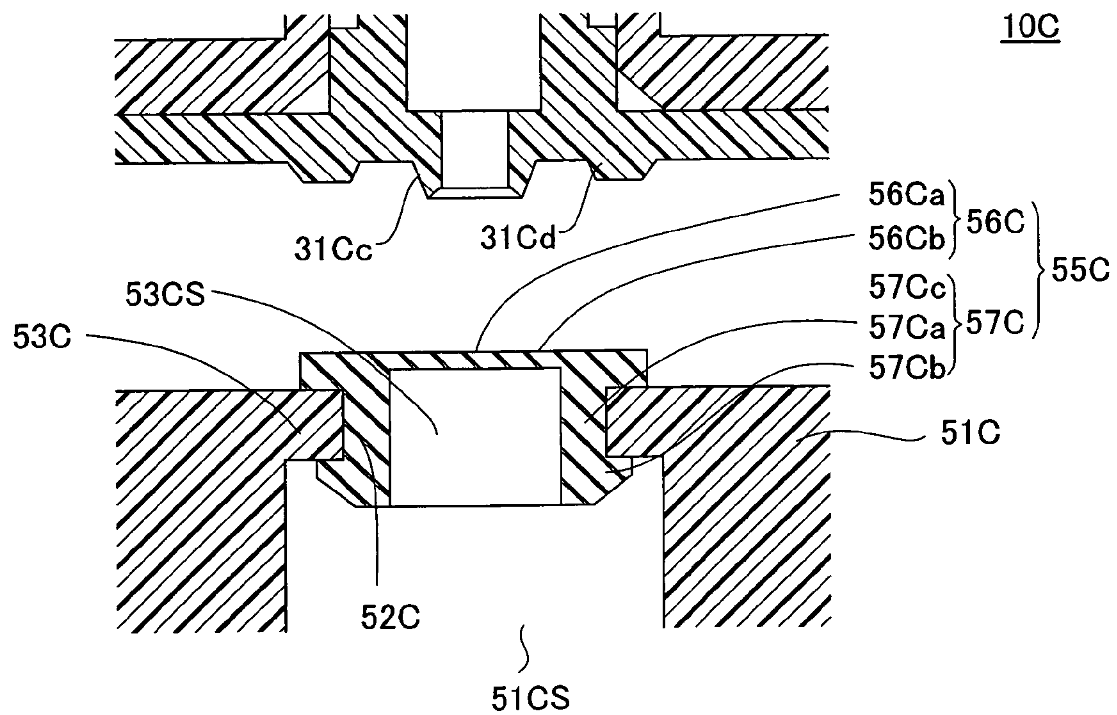
FIG. 14 is a cross sectional view showing the fuel cutoff valve of a third embodiment.
Figure 15:
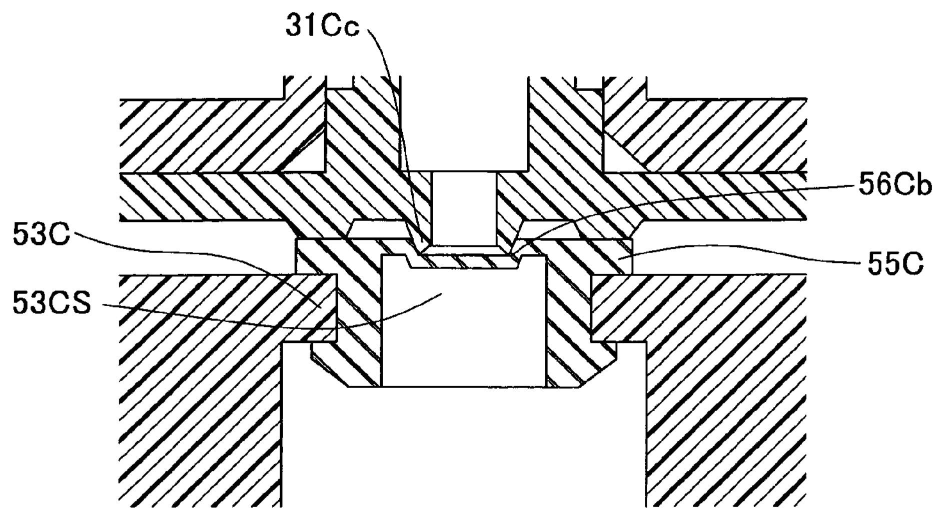
FIG. 15 describes the movement of the fuel cutoff valve of the third embodiment.

FIG. 14 and FIG. 15 are cross sectional views showing a fuel cutoff valve 10C of a third embodiment. The embodiment is characterized by the constitution of a valve support 53C and seat member 55C. Specifically, a buoyancy chamber 51CS opened downward is formed on a float 51C. At the center of the upper part of the float 51C is formed a through hole 52C which is linked to the buoyancy chamber 51CS. The valve support 53C is formed on the upper part of the float 51C. The valve support 53C is a peripheral wall projecting toward the center from the opening peripheral edge part of the through hole 52C. The space of the upper part of the through hole 52C becomes a bending space 53CS. A seat member 55C is equipped with a seat part 56C formed from a seat surface

56Ca and an elastic deforming part 56Cb, and a supported part 57C set projecting downward from the outer peripheral part of the seat part 56C. The supported part 57C is equipped with a side wall 57Ca set projecting with a thicker wall than the elastic deforming part 56Cb, a stopper 57Cb set projecting outward at the bottom end of the side wall 57Ca, and a support part 57Cc set projecting outward at the top end of the side wall 57Ca. By pressing the supported part 57C into the valve support 53C, the side wall 57Ca is fitted to the valve support 53C, and by engaging with the stopper 57Cb to the bottom surface of the valve support 53C, in a state with the valve support 53C sandwiched by the support part 57Cc and the stopper 57Cb, the seat member 55C is mounted in the valve support 53C. According to the embodiment, compared to the first and second embodiments, the valve support 53C is not projecting out from the upper surface of the float 51C, so it is possible to have a low height of the float 51C.

With the constitution, as shown in FIG. 15, when closing the fuel cutoff valve 10C, when the seat member 55C seats on the seal part 31Cc be surrounded by restriction elements 31Cd, elastic deformation is done with a low load by the elastic deforming part 56Cb and this is bent toward the inside of the bending space 53CS of the valve support 53C, and it is possible to obtain high sealing properties.

D. Other Embodiments

The present invention is not limited to the embodiments noted above, and it is possible to implement various aspects in a scope that does not stray from the key points, for example, the following kinds of variations are possible.

Figure 16:
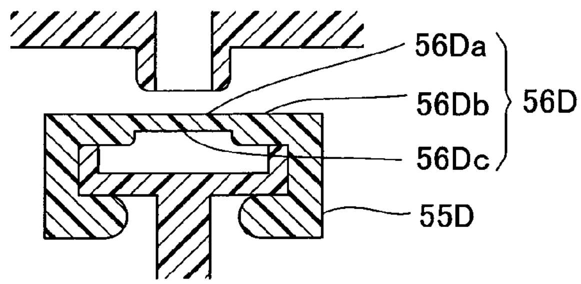
FIG. 16 is a cross sectional view showing the periphery of the seat member of a fourth embodiment.

(1) FIG. 16 is a cross sectional view showing the periphery of a seat member 55D of a fourth embodiment. The seat member 55D is provided with a thin walled part 56Dc that is the center part of a seat part 56D on the back surface side of a seat surface 56Da, making elastic deformation of an elastic deforming part 56Db easy.

Figure 17:
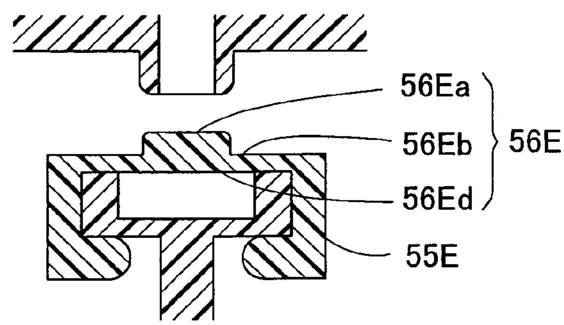
FIG. 17 is a cross sectional view showing the periphery of the seat member of a fifth embodiment.

(2) FIG. 17 is a cross sectional view showing the periphery of a seat member 55E of a fifth embodiment. A thick walled part 56Ed that is the center part of the seat part 56E is provided at the surface side of a seat surface 56Ea, increasing durability and making elastic deformation of an elastic deforming part 56Eb easy.

Figure 18:
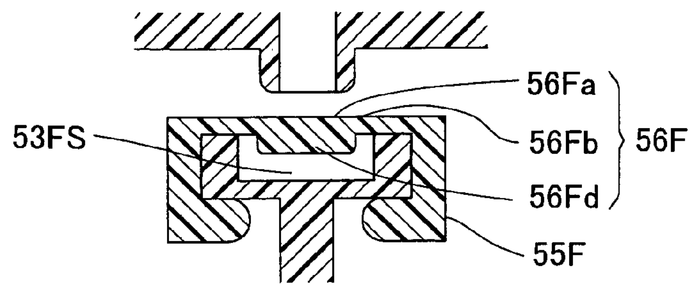
FIG. 18 is a cross sectional view showing the seat member of a sixth embodiment.

(3) FIG. 18 is a cross sectional view showing a seat member 55F of a sixth embodiment. With a seat member 55F, by having a thick walled part 56Fd that is the center part of a seat part 56F project at the back surface side of a seat surface 56Fa, by being in contact with the bottom of a bending space 53FS, this restricts the elastic deformation volume of the seat part 56F, increasing the durability as well as making the elastic deformation of an elastic deforming part 56Fb easier.

Figure 19:
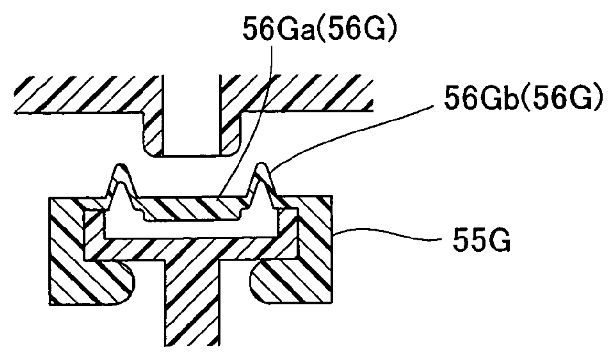
FIG. 19 is a cross sectional view showing the seat member of a seventh embodiment.

(4) FIG. 19 is a cross sectional view showing a seat member 55G of a seventh embodiment. The seat member 55G has a seat surface 56Ga and an elastic deforming part 56Gb of a seat part 56G in an accordion shape, making elastic deformation easier.

Figure 20:
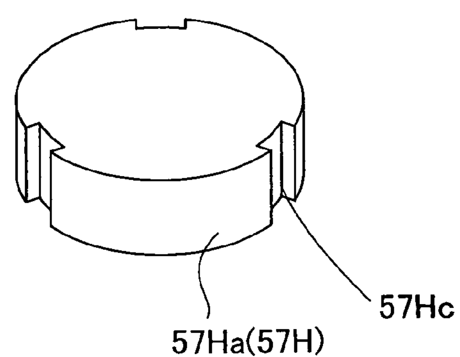
FIG. 20 is a perspective view showing the seat member of an eighth embodiment.

(5) FIG. 20 is a perspective view showing a seat member 55H of an eighth embodiment. The seat member 55H of the embodiment improves the mountability to the valve supporting member by forming a thin walled part 57Hc on part of a side wall 57Ha of a supported part 57H.

Figure 21:
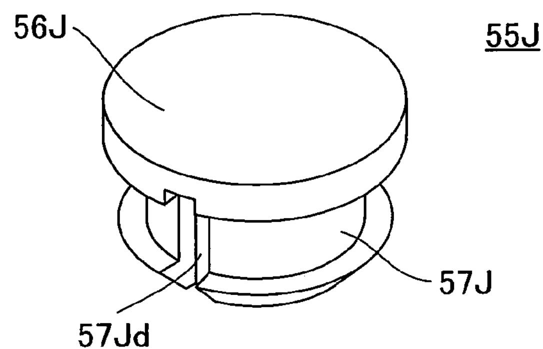
FIG. 21 is a perspective view showing the seat member of a ninth embodiment.

(6) FIG. 21 is a perspective view showing a seat member 55J of a ninth embodiment. The embodiment is a variation example of the seat member 55C shown in FIG. 14, and by providing a slit 57Jd that divides into a PLURALITY in the circumference direction a supported part 57J of the seat member 55J, it is also possible to make the work of pressing into the valve support easier. Note that the slit 57Jd is also operated as the air release by reaching the side surface of a seat part 56J.

Figure 22:
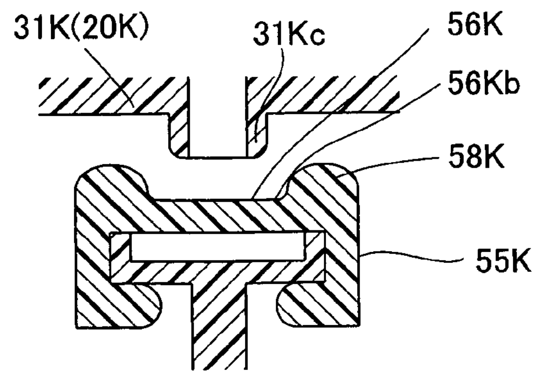
FIG. 22 is a cross sectional view showing the periphery of the seat member of a tenth embodiment.

(7) FIG. 22 is a cross sectional view showing a variation example for which the durability is improved by restricting the elastic deformation volume of the seat member of a tenth embodiment. In FIG. 22, a seat member 55K restricts the elastic deformation volume of a seat part 56K by forming a restriction element 58K consisting of a circular projecting part at the outer periphery of the seat part 56K and being in contact with the wall surface of a top wall part 31K of the outer periphery of a seal part 31Kc.

Figure 23:
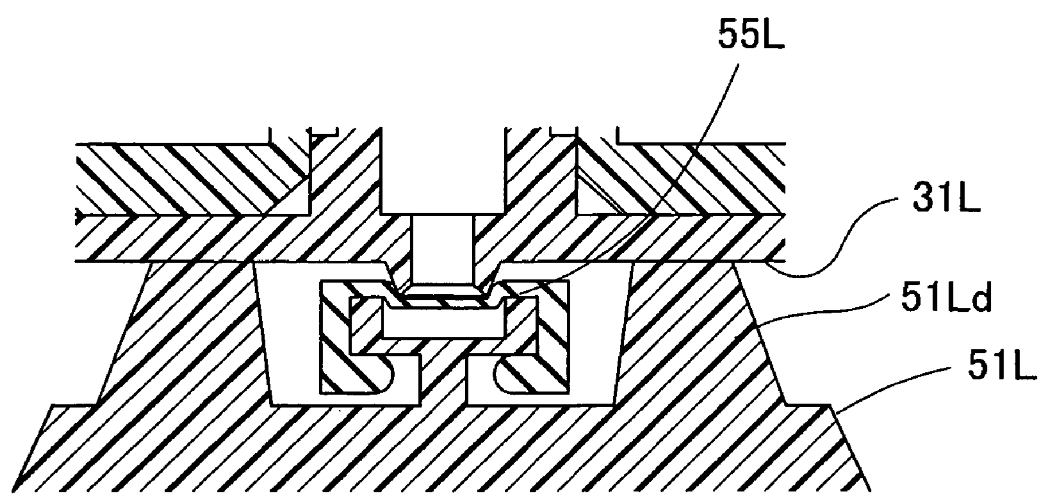
FIG. 23 is a cross sectional view showing the main elements of the fuel cutoff valve of an eleventh embodiment.

FIG. 23 is a cross sectional view showing the main parts of a fuel cutoff valve of an eleventh embodiment. A restriction element 51Ld consisting of a circular projecting part is formed on the upper part of a float 51L. The restriction element 51Ld restricts the elastic deformation volume of a seat member 55L by being in contact with the wall surface of a top wall part 31L of the outer periphery of the seal part.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in the art and are encompassed within the spirit and scope of the appended claims.

What is claimed is:

1. A fuel cutoff valve that is mounted on an upper part of a fuel tank to open and close a connection path that connects an inside of the fuel tank and with outside, the fuel cutoff valve comprising:

a casing having (i) a valve chamber that communicates the inside of the fuel tank and the connection path and (ii) a seal part that projects in a circular shape toward the valve chamber, the seal part being provided in the connection path; and a float mechanism having (i) a float that is stored within the valve chamber and that rises according to a fuel fluid level within the fuel tank, (ii) a valve support that is formed on an upper part of the float, and (iii) a seat member mounted on the valve support that opens and closes the connection path by seating on and separating from the seal part, wherein the seat member has (i) a seat part formed from a flexible material and includes a seat surface that seats on and separates from with the seal part and (ii) an elastic deforming part formed along an outer periphery of the seat surface, and (iii) a supported part that projects from an outer periphery of the seat part with a thicker wall than the elastic deforming part and that is mounted for the valve support, the valve support has a bending space with an inner diameter larger than an outer diameter of the seal part, the bending space being configured to be formed to allow elastic deformation of the elastic deforming part when the seat surface seats on the seal part, the valve support has a support projection part projecting from an upper part of the center of the float, and the bending space is formed at an axial center of the support projection part, and the support projection part comprises a support base projecting from the upper part of the center of the float, a disk extending in radial direction from an upper part of the support base, and a cylinder formed facing upward from an outer periphery of the disk, and the bending space is formed by an upper surface of the disk and an inner wall of the cylinder.

2. The fuel cutoff valve in accordance with claim 1, wherein the supported part comprises a side wall that is formed in a cylindrical shape from an outer periphery of the seat part and that covers an outer periphery wall of the valve support, and a stopper formed on a lower end of the side wall that stops pulling out from the valve support.

3. The fuel cutoff valve in accordance with claim 1, wherein the elastic deforming part is formed to have different thicknesses of the seat surface.

4. The fuel cutoff valve in accordance with claim 1, wherein the elastic deforming part is formed in accordion form connected to be elastically deformable with the seat surface and the supported part.

5. The fuel cutoff valve in accordance with claim 1, wherein the side wall of the supported part comprises a part formed to be thin-walled in an axial direction.

6. The fuel cutoff valve in accordance with claim 1, wherein the supported part comprises a slit formed in an axial direction at a side wall thereof.

7. A fuel cutoff valve according to claim 1, wherein the fuel cutoff valve further includes a restriction element that, in a state in which the seat member seats on the seal part, restricts the elastic deformation volume of the seat member.

8. The fuel cutoff valve in accordance with claim 7, wherein the restriction element comprises a projection that projects from an inner wall of the casing and is formed to surround an outer periphery of the seal part.

9. The fuel cutoff valve in accordance with claim 8, wherein the restriction element comprises a plurality of parts arranged in a circumferential direction to surround the center of the seal part.

10. The fuel cutoff valve in accordance with claim 7, wherein the float comprises a valve support at an upper part of the float, wherein the valve support includes a bending space having an inner diameter larger than an outer diameter of the seal part, the bending space being configured to allow elastic deformation of the elastic deforming part when the seat surface seats on the seal part, and the restriction element is formed such that the seat surface is not in contact with a bottom of the bending space.

11. The fuel cutoff valve in accordance with claim 7, wherein the restriction element is a projection formed around an outer periphery of the seat part, the projection being configured such that the elastic deformation volume of the elastic deforming part is restricted by having contact with the inner wall of the casing.

12. The fuel cutoff valve in accordance with claim 7, wherein the restriction element projects to surround the seat member on an upper part of the float.

* * * * *